United States Patent [19]

Beck et al.

[11] 4,055,471
[45] Oct. 25, 1977

[54] METHOD OF RESTRICTING THE FORMATION OF DUST WHEN FEEDING COAL INTO COKE OVENS

[75] Inventors: Kurt-Günther Beck; Wolfgang Rohde; Diethard Habermehl; Werner Siebert, all of Essen, Germany

[73] Assignee: Bergwerksverband GmbH, Essen, Germany

[21] Appl. No.: 646,751

[22] Filed: Jan. 6, 1976

[30] Foreign Application Priority Data

Jan. 9, 1975  Germany .............................. 2500606

[51] Int. Cl.² .............................................. C10B 57/04
[52] U.S. Cl. ........................................ 201/20; 201/21; 201/23
[58] Field of Search ..................... 201/6, 9, 20, 21, 25, 201/28, 23, 40

[56] References Cited

U.S. PATENT DOCUMENTS

| | | | |
|---|---|---|---|
| 1,875,287 | 8/1932 | Weber | 201/20 X |
| 1,920,951 | 8/1933 | Ramsburg | 201/23 |
| 2,314,641 | 3/1943 | Wolf | 201/20 X |
| 2,336,154 | 12/1943 | Wolf | 201/20 X |
| 2,378,420 | 6/1945 | Lohr et al. | 201/23 |
| 2,556,154 | 6/1951 | Kern | 201/20 X |
| 2,591,496 | 4/1952 | Berl | 201/20 |
| 3,146,183 | 8/1964 | Reed et al. | 201/23 |
| 3,151,041 | 9/1964 | Heinze et al. | 201/6 |
| 3,637,464 | 1/1972 | Walsh et al. | 201/6 |

Primary Examiner—Morris O. Wolk
Assistant Examiner—Arnold Turk
Attorney, Agent, or Firm—Michael J. Striker

[57] ABSTRACT

A method for inhibiting dust formation while feeding coal into a coking chamber, comprising preheating coal and subsequently contacting the coal with an aqueous solution of 30-70% by weight of waste sulfite liquor in amounts of about 0.5 to 1.0 parts by weight of said solution per 1000 parts by weight of said coal.

8 Claims, 1 Drawing Figure

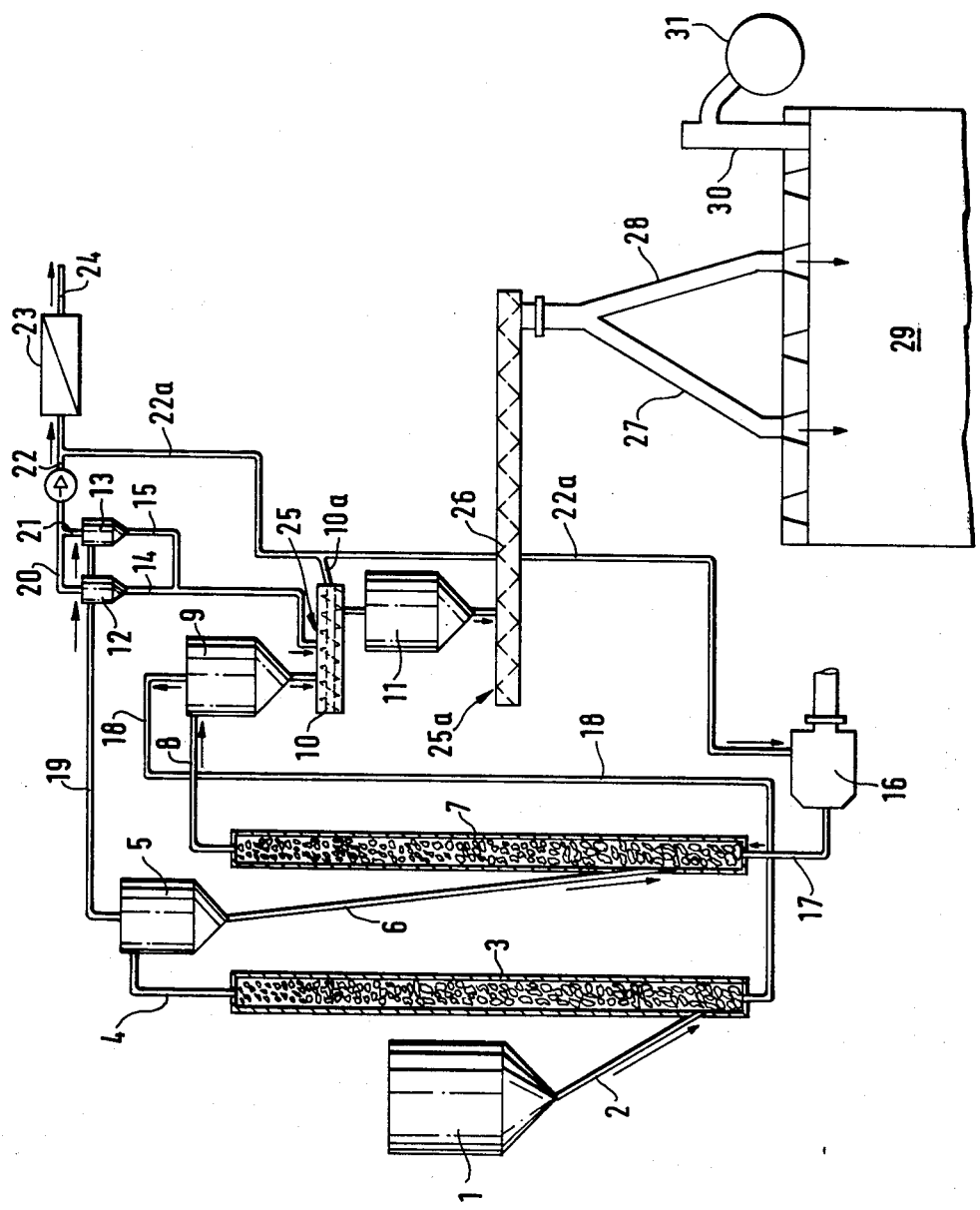

METHOD OF RESTRICTING THE FORMATION OF DUST WHEN FEEDING COAL INTO COKE OVENS

BACKGROUND OF THE INVENTION

The invention relates generally to the coking of coal.

The thermal pretreatment of coking coal, that is, the preheating of coking coal prior to the introduction thereof into coke ovens, is today widely used in coking practice. The most important coal mining nations utilize this process step in the production of coke for the blast furnace in order to improve the utilization of the coking coal. Thus, by using the thermal pretreatment technique, it becomes possible to increase the proportion, in the starting coal mixture, of coal having poor coking characteristics. Furthermore, the quality of the coke, and especially the resistance to abrasion, is improved by virtue of the thermal pretreatment. In addition, the thermal pretreatment technique provides the advantage that the throughput of coke ovens have horizontal coking chambers may be increased.

Although the thermal pretreatment, which involves heating the coal to temperatures of 130° to 190° C and, advantageously, to temperatures of 150° to 180° C, does not, of itself, cause any technical problems, the handling of the preheated coal, and particularly the feeding of the coal into horizontal coking chambers, poses great difficulties. The reason resides in that only very poor control is possible over that portion of the coal which is in finely divided form, that is, over the fine coal dust. A typical analysis in the particle size for thermally preheated coal might appear as follows:

| | |
|---|---|
| Coal particles having a size less than 2 millimeters | 75–80 percent |
| Coal particles having a size less than 0.5 millimeters | 35–50 percent |
| Coal particles having a size less than 100 microns | about 18 percent |

The current regulations in effect for environmental protection Thus make it necessary to transport the preheated coal from the preheating installation to the horizontal coking chambers via closed conduits and/or containers and to then charge the coal directly into the coking chambers from the conduits and/or containers.

When the preheated coal is charged into a hot coking chamber, there immediately occurs a vigorous degassing of those coal particles which come into contact with the hot stone surfaces of the chamber. These surfaces have temperatures of about 1000° to 1200° C. The crude gases produced in this manner flow through the loose coal charge which has already been fed into the coking chamber and entrain fine coal dust from this charge. Thereafter, the crude gases traverse the coal stream which is in the process of being introduced into the coking chamber and are again loaded with fine coal dust. Thus, crude gas which is highly loaded with coal dust leaves the coking chamber via the uptake conduit during charging of the coal into the chamber. The loaded crude gas escapes into a collecting means. This so-called "carry over", together with the tar which likewise escapes into the collecting means in the form of vapor and which is deposited by means of water, forms a highly viscous mass which is difficult to handle. Moreover, a portion of the finely divided coal dust is carried into the tar separator along with the condensate which flows off from the collecting means and, as a result, difficulties arise during the separation of the tar and the water due to the formation of an emulsion. Finally, the high water and solids content of the crude tar leads to substantial problems in the further processing of the tar in distillation installations.

It has already been attempted several times to reduce the escape of dust, that is, the "carry over", which arises during the charging of coal into coking chambers by binding the finest coal particles to coarser coal particles. In particular, the addition of mineral oil fractions has been proposed in order to effect an agglomeration of this type. This measure, which is relatively simple in itself and which has proved itself in the feeding of moist coal into coking chambers, gives rise to considerable difficulties when preheated coal is used. Thus, when an oil which readily distributes itself over the surface of the coal and which has a low to medium boiling point is used, the oil evaporates before it can become effective for the charging operation. On the other hand, if a heavy fuel oil is selected, uniform distribution of the oil over the total surface of the coal can hardly be achieved inasmuch as the tendency of the fuel oil to wet the preheated coal is low. Moreover, in this case also the oil evaporates partially or completely from the surface of the coal since the oil already tends to evaporate at substantially lower temperatures than would be expected on the basis of the vaporization characteristics of the heavy oil. Consequently, the binding effect of the heavy oil is dissipated to a large extent within a very short period of time.

SUMMARY OF THE INVENTION

One object of the invention is to provide a method of inhibiting the dust formation which occurs when coal is fed into a coking chamber and which method is more reliable than the methods of the prior art.

Another object of the invention is to provide a method of inhibiting the dust formation which occurs when coal is fed into a coking chamber and which method is effective when the coal is preheated.

These objects, as well as others which will become apparent, are achieved in accordance with the invention. One aspect of the invention resides in a method of inhibiting dust formation when coal is fed into a coking chamber wherein the coal is contacted with an aqueous solution of a substance which is capable of binding dust-like coal particles. The contacting operation is performed prior to feeding the coal into the coking chamber.

The solution with which the coal is contacted will also be referred to herein as a binding solution.

According to another aspect of the invention, there is provided a method of inhibiting dust formation when coal is fed into a coking chamber wherein the coal is contacted with tar prior to feeding the coal into the coking chamber.

The novel features which are considerable as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE schematically represents one form of an arrangement which may be used for carrying out a method according to the invention.

DESCRIPTION OF THE PREFERRED EMBODIMENTS

It has now been found that the escape of coal dust during the introduction of coal, particulary preheated coal, into coke ovens may be reduced in that an aqueous solution of a substance which is capable of binding dust-like coal particles is admixed with the coal. When preheated coal is used, the coal is favorably heated to temperatures between 130° to 190° C. The binding solution is admixed with the coal after preheating, that is, the binding solution is admixed with the heated coal.

Preferably, the binding solution is admixed with the coal in quantities of 0.5 to 1.0 parts by weight of solution per 1000 parts by weight of coal. The binding solution is favorably a 30 to 70 percent by weight solution of the substance which is capable of binding dust-like coal particles.

With the aid of such a solution, there is achieved in the preheated coal a long-lasting effect of agglomeration and conglomeration of its fine and finest particles. Surprisingly, the above-mentioned small quantities of the binding solution are already sufficient to provide this effect.

The substance which is capable of binding dust-like coal particles will also be referred to herein as a binder.

Sulfite liquors, for instance, waste sulfite liquors, are particularly well-suited as binders for the aqueous solution. The sulfite liquors are generally already commercially available as 50 percent liquors. Other suitable binders include, in particular, starches, dextrin, molasses, casein and glues.

The wetting of the hot coal may be improved by the addition of surfactants to the binding solution. Preferably, the surfactants are used in quantities of at most about 1 percent by weight as calculated on the basis of the quantity of binding solution. Exemplary of the substances which may be used as surfactants are sodium soap, potassium soap, sulfate of fat alcohols and fat alcoholpolyoxyethylene products.

In order to improve the distribution of the binding solution on the surfaces of the hot coal particles, it is possible to add crude tar as a further distribution medium in addition to the water of the binding solution, which water is not, of itself, desired. The crude tar is favorably derived from bituminous coal. Preferably, the binding solution is mixed with 10 to 50 times by weight of the tar. Crude tar is obtained during the coking of coal so that the crude tar which is added to the binding solution may be introduced into the coking operation. If necessary or desirable, the crude tar which is added to the binding solution may be derived from coal which has been previously coked in the coking chamber so that the crude tar may, in such an event, be recycled to the coking operation. Due to the fact that crude tar always has a certain water content, the crude tar may, without difficulty, be mixed with the aqueous binding solution so as to form an emulsion. Consequently, a simple stirring of the components in a preparation vessel suffices to yield an additive which, as a result of its supply of binder in a well-distributed form, further improves the desired effect.

Crude tars with which it is possible to dilute the binding solution to a degree have approximately the following composition:

- 5 to 30 percent by weight of a light fraction which boils at temperatures between about 170° and 270° C at normal or atmospheric pressure;
- 15 to 30 percent by weight of a medium fraction which boils at temperatures between about 270° and 350° C; and
- a remainder of approximately 45 to 65 percent by weight composed of tar components which boil at temperatures in excess of 350° C.

It is desirable, in any event, that the mixture of crude tar and binding solution be heated prior to the addition thereof to the hot coal. Advantageously, the emulsion or mixture of crude tar and binding solution is heated to temperatures between 60° and 90° C.

In order to bring the emulsion of crude tar and binding solution into contact with the coal, it is sufficient if the preheated coal is sprayed with the emulsion. This is particularly true when using crude tar which is derived from the same coking operation or when using crude tar which has been derived from the same type of coal or coal mixture as that which is to be fed into the coking chamber after contact with the emulsion. The spraying or contacting of the coal with the emulsion, may for example, be accomplished while the coal is on its way from the preheating installation to the individual coke ovens of a coke oven battery. Although the use of mixing devices for mixing the coal with the emulsion is recommended, this is not necessary.

As is known to those skilled in the art, the nature, that is, the structure, of the individual components of crude tar is strongly dependent upon the type of coal, or the particular coal, from which the crude tar stems. It has now been surprisingly found the ability of crude tar to wet preheated coal is particularly marked if the crude tar which is sprayed onto or in contact with the coal has been derived from the coking of the same type of coal or coal mixture as that being contacted with the crude tar.

From this it is clear that, if the preheated coal is sprayed or contacted with tar derived from the same coking operation, or with tar derived from the coking of the same type of coal or coal mixture as that constituting the preheated coal, there is obtained a dust binding effect, without the addition of a binder in aqueous solution, which is as good, or practically as good, as that obtained when using a binder in aqueous solution.

Thus, one of the embodiments of the invention contemplates contacting coal to be coked with tar, and not with an aqueous solution of a binder, prior to feeding the coal into the coking chamber. It follows from the above that it is particularly advantageous for the tar to be derived from the same type of coal or coal mixture as is contacted with the tar. Preferably, the coal to be coked is contacted with 0.5 to 3 percent by weight of the tar. The tar is favorably heated to temperatures between 80 and 130° C before being contacted with the coal to be coked.

The invention will now be further described with reference to the sole FIGURE.

Coking coal which, in general, has a particle size of 0.06 to 6 millimeters and a water content of about 8 to 12 percent by weight, is obtained from a supply container 1. From the container 1, the coal is fed into the bottom of a first pneumatic conveying dryer 3 via a conduit 2. The coal travels upwardly through the drying 3 and, concomintantly, is subjected to a first drying and preheating stage.

The coal leaves the dryer 3 through a conduit 4 and, from the latter, is introduced into a cyclone 5 where it is removed from the gas which entrained it and carried it through the dryer 3. From the cyclone 5, the coal slides to the bottom of a second pneumatic conveying dryer 7 via a conduit 6. The coal travels up wardly through the dryer 7 and, simultaneously, is subjected to a second drying and preheating stage.

The coal leaves the dryer 7 through the top thereof and enters a conduit 8 from which it is introduced into a cyclone 9. In the cyclone 9, the coal is removed from the gas which entrained it and carried it through the dryer 7. Since the fine portions of the coal are carried out of the cyclone 5 as coal dust together with the combustion gases which carry the coal through the dryer 3, it is essentially only the coarser portions of the preheated coal which are collected in the cyclone 9. The coarser portions of the coal are forwarded to an intermediate or storage and feed container 11 via a screw conveyor 10.

The hot combustion gases in the cyclone 5 containing the fine portions of the coal are withdrawn from the cyclone 5 via a conduit 19. The thus-withdrawn combustion gases are then admitted into cyclones 12 and 13 wherein they are freed from the fine portions of the coal, that is, the coal dust. The thus-recovered fine coal is forwarded to the screw conveyor 10 through conduits 14 and 15.

The heating and conveying of the coking coal is effected with gases obtained from a combustion chamber 16. The hot gases produced therein, for instance, by the combustion of oil, initially flow through a conduit 17 into the dryer 7. After passing through the dryer 7, the hot combustion gases then pass through the conduit 8 into the cyclone 9 together with the coal which has been preheated in the dryer 7. From the cyclone 9, the hot combustion gases flow through a conduit 18 into the dryer 3.

In the dryer 3, the hot combustion gases convey the initially moist coal to and through the conduit 4 and into the cyclone 5. From the cyclone 5, the hot gases flow through the conduit 19 into the cyclone 12 and 13 mentioned earlier. The hot gases leave the cyclones 12 and 13 via conduits 20 and 21 and thereafter are conveyed into a conduit 22. The conduit 22 opens into a wet washer 23 and all or a portion of the hot gases flowing through the conduit 22 may enter the washer 23. The gases entering the washer 23 leave the apparatus as purified gases via a conduit 24.

A conduit 22a branches off from the conduit 22 and leads to the combustion chamber 16 and all or a portion, as desired, of the hot, water-containing gases flowing through the conduit 22 may be branched off through the conduit 22a. The hot gases flowing through the conduit 22 contain water since they have been used for drying of the initially moist coal. The hot, water-containing gases (vapors) withdrawn from the conduit 22 via the conduit 22a are returned to the combustion chamber 16.

Prior to entry of the coal into the storage and feed container 11, the preheated coal is sprayed with a binding solution or, instead, contacted with tar, at the locations indicated by the arrows marked 25. Particularly favorably, the preheated coal is sprayed with a binding solution or, instead, contacted with tar, in the screw conveyor 10 at or adjacent the inlet provided for coal of dust-like form. The gases released may escape from the screw conveyor 10 into the vapor line 22a via a conduit 10a.

When the coal stored in the container 11 is to be coked, the coal slides out of the container 11 into a chain conveyor 26. The conveyor 26 conveys the coal to conduits 27 and 28 through which the coal is fed into a coke oven 29. It is possible to spray a binding solution or, instead, admit tar, into the conveyor 26 also as indicated by the arrow 25a.

An uptake 30 is connected to the coke oven 29. The reference numeral 31 identifies a collecting means in which the respective "carry over" is determined.

The following Examples are intended to further illustrate the invention and are not to be considered as limiting the same in any manner:

EXAMPLE 1

A mixture of bituminous coals obtained from the Alpheus and Corbin mines of the United States has a volatiles content of 28 percent. The coal is heated to 190° C by pneumatic conveying techniques and is then charged into a closed mixing screw such as the screw conveyor 10. Upon entering the screw or conveyor, the coal is sprayed with an aqueous 40 percent sulfite liquor. The aqueous sulfite liquor is used in a quantity of 0.8 grams per kilogram of coal. The sprayed coal leaves the conveyor or screw and enters an intermediate or feed container such as the container 11. From the container, the sprayed coal travels onto a chain conveyor such as the conveyor 26 having a length of 70 meters. This conveyor opens into a charging hopper. From the hopper, the sprayed coal is permitted to slide into a coke oven such as the oven 29 via conduits which are connected to the filling holes of the oven. After completion of the filling operation, the "carry oven" is determined in the collecting means. The "carry over" is found to be 10 kilograms of coal dust per ton of coal charged into the coke oven.

EXAMPLE 2

A coal mixture as in Example 1 is heated to 190° C and then charged into a mixing screw such as the screw conveyor 10. Upon entering the screw or conveyor, the coal is sprayed with an emulsion consisting of 10 parts by weight of an aqueous 60 percent sulfite liquor and 90 parts by weight of crude tar. The emulsion is used in a quantity of 4.4 grams per kilogram of coal. A commercial sulfonate of a fat alcohol, in a quantity of 0.5 percent by weight, was added to the sulfite liquor. From the mixing screw or conveyor, the sprayed coal is conveyed to a chain conveyor such as the conveyor 26 via an intermediate or feed container such as the container 11. Upon entering the chain conveyor, the coal is once again sprayed with the emulsion. The emulsion is again used in a quantity of 4.4 grams per kilogram of coal. Thereafter, the coal, which is subjected to a further mixing action in the chain conveyor, is introduced into a coke oven. After completion of the charging operation, the "carry over" is determined in the collecting means. The "carry over" is found to be 8 kilograms of coal dust per ton of coal charged into the coke oven.

When using an aqueous 60 percent solution of starch, casein, dextrin, molasses or glue while otherwise maintaining the composition of the emulsion identical with that of Example 2, the "carry over" was found to be 7 ± 1 kilograms of coal dust per ton of coal charged into the coke oven.

EXAMPLE 3

A coal mixture as in Example 1 is introduced into a chain conveyor such as the conveyor 26. When the coal enters the conveyor, crude tar is added thereto. The crude tar is obtained from the same coking operation as that in which the coal mixture is involved, that is, the crude tar is derived from a coal mixture of the same type as that introduced into the chain conveyor. The crude tar is used in a quantity of 5 grams per kilogram of coal and is heated to 90° C prior to being added to the coal. The coal is charged into a coke oven and, after completion of the charging operation, the "carry over" is determined. The "carry over" is found to be 13 kilograms of coal dust per ton of coal charged into the coke oven.

If coal as in Example 1 is preheated to temperatures of 150° to 160° C and sprayed, in a chain conveyor such as the conveyor 26, with residual oils derived from the petroleum industry in quantities of 5 grams residual oil per kilogram of coal, then the "carry over" after completion of the charging operation is found to be 18 kilograms of coal dust per ton of coal charged into the coke oven. Admixtures of pitch to the residual oil do not lead to any appreciable reduction in the "carry over".

It will be understood that each of the elements described above, or two or more together, may also find a useful application in other types of operations differing from the types described above.

While the invention has been illustrated and described as embodied in a method of inhibiting dust formation when coal is fed into coke ovens, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics or the generic or specific aspects of this invention.

What is claimed as new and desired to be protected by Letters Patent is set forth in the appended claims.

1. A method of inhibiting dust formation while feeding coal into a coking chamber, comprising preheating coal, and subsequently contacting said coal with an aqueous solution of 30–70% by weight of waste sulfite liquor in amounts of about 0.5 to 1.0 parts by weight of said solution per 1000 parts by weight of said coal.

2. A method of inhibiting dust formation while feeding coal into a coking chamber, comprising preheating coal to a temperature between 130° and 190° C., and subsequently contacting said coal with an aqueous solution of 30–70% by weight of waste sulfite liquor in amounts of about 0.5 to 1.0 parts by weight of said solution per 1000 parts by weight of said coal.

3. The method of claim 2, wherein said solution comprising 40% by weight of sulfite liquor is added in a quantity of 0.8 grams per kilogram of coal, and subsequently crude tar derived from the coking of the same type of coal and heated to 90° C. is added to the coal in a quantity of 5 grams per kilogram of coal.

4. The method of claim 2, wherein said solution additionally includes a surfactant.

5. The method of claim 4, wherein said solution comprises at most about 1 percent by weight of said surfactant.

6. A method of inhibiting dust formation while feeding coal into a coking chamber, comprising preheating coal; forming an emulsion which comprises an aqueous solution of 30–70% by weight of waste sulfite liquor and which amounts to about 0.5 to 1.0 parts by weight of said solution per 1000 parts by weight of said coal, and an amount of tar 10–50 times by weight, the tar being derived from the coking of the same type of coal as is preheated in said preheating step; and subsequently contacting said coal with said emulsion.

7. A method of inhibiting dust formation while feeding coal into a coking chamber, comprising preheating coal to a temperature of 190° C.; forming an emulsion comprising 10 parts of a solution composed of a surfactant which is a sulfonate of a fat alcohol and which amounts to 0.5% by weight of the solution, and waste sulfite liquor which amounts to 60% by weight of the solution, and 90 parts by weight of crude tar; and subsequently contacting said coal with said emulsion in an amount sufficient to inhibit dust formation.

8. A method of inhibiting dust formation while feeding coal into a coking chamber, comprising preheating coal; forming an emulsion comprising an aqueous solution of 30–70% by weight of waste sulfite liquor and which amounts to about 0.5 to 1.0 parts by weight of said solution per 1000 parts by weight of said coal, and an amount of tar 10–50 times by weight of tar which is derived from bituminous coal; and subsequently contacting said coal with said emulsion.

* * * * *

UNITED STATES PATENT AND TRADEMARK OFFICE
CERTIFICATE OF CORRECTION

PATENT NO. : 4,055,471
DATED : October 25, 1977
INVENTOR(S) : Kurt-Günther Beck et al It is certified that error appears in the above—identified patent and that said Letters Patent are hereby corrected as shown below:

In the heading [73], the name and address of the second assignee should be added, and read -- Didier Engineering GmbH, Essen, Germany --.

Signed and Sealed this

First Day of December 1981

[SEAL]

Attest:

GERALD J. MOSSINGHOFF

*Attesting Officer*     *Commissioner of Patents and Trademarks*